July 2, 1940.  H. J. STREYCKMANS  2,206,134
MULTIPLE MOTION PICTURE PROJECTOR
Filed Aug. 26, 1938   7 Sheets-Sheet 1
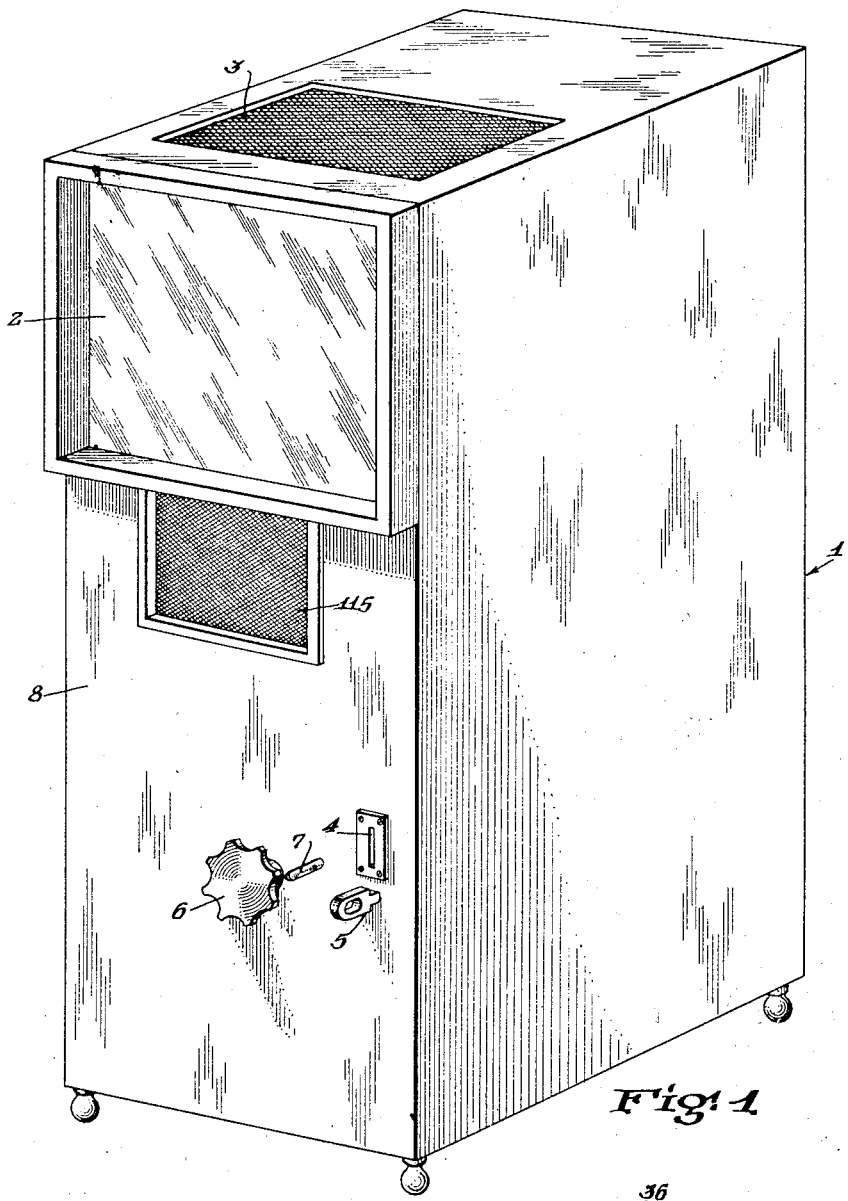
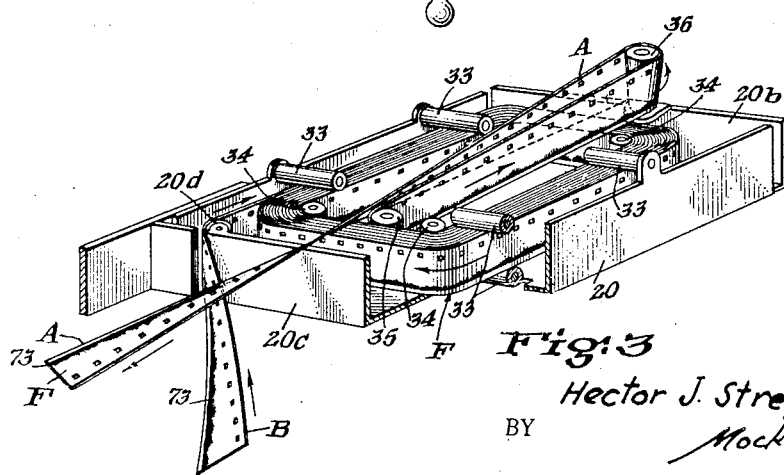
INVENTOR.
Hector J. Streyckmans
BY
Mock & Blum
ATTORNEYS July 2, 1940.   H. J. STREYCKMANS   2,206,134
MULTIPLE MOTION PICTURE PROJECTOR
Filed Aug. 26, 1938   7 Sheets-Sheet 2

INVENTOR.
Hector J. Streyckmans
BY
Mock & Blum
ATTORNEYS

July 2, 1940.  H. J. STREYCKMANS  2,206,134
MULTIPLE MOTION PICTURE PROJECTOR
Filed Aug. 26, 1938  7 Sheets-Sheet 3

INVENTOR.
Hector J. Streyckmans
BY Mock & Blum
ATTORNEYS

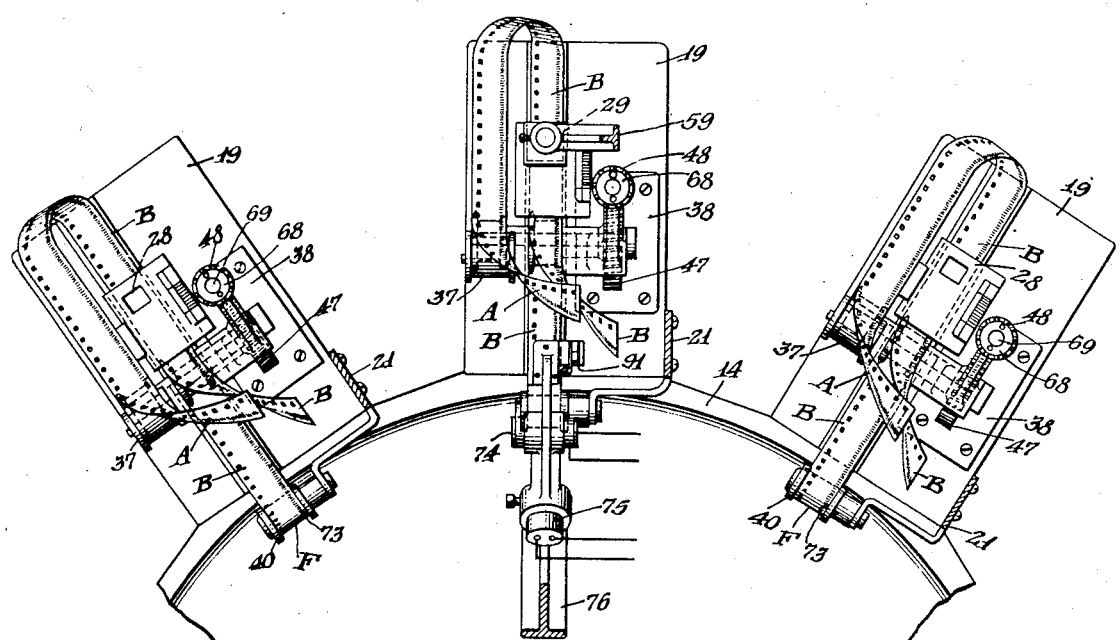
Fig. 6
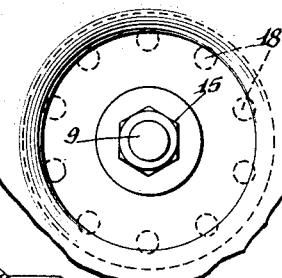
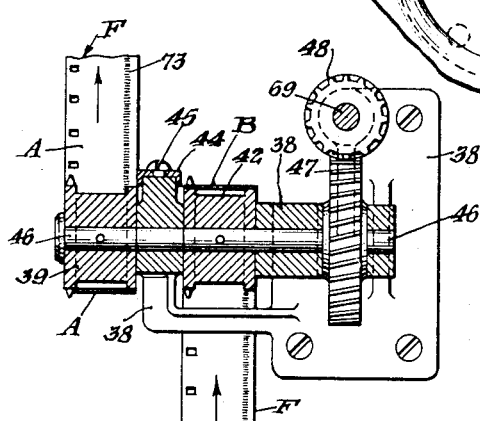
Fig. 9
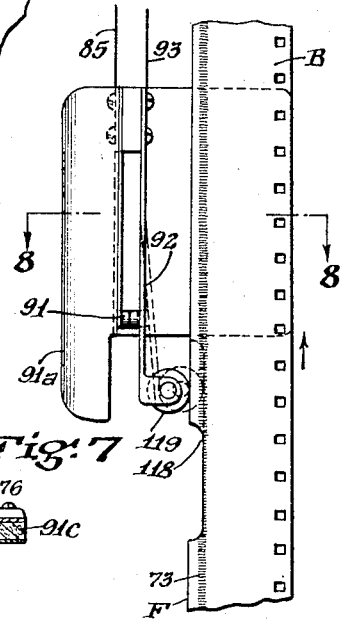
Fig. 7
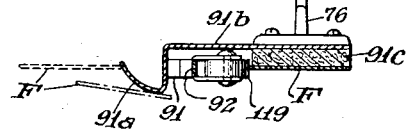
Fig. 8
INVENTOR.
Hector J. Streyckmans
BY Mock & Blum
ATTORNEYS July 2, 1940.  H. J. STREYCKMANS  2,206,134

MULTIPLE MOTION PICTURE PROJECTOR

Filed Aug. 26, 1938   7 Sheets-Sheet 6

INVENTOR.
Hector J. Streyckmans
BY Mock & Blum
ATTORNEYS

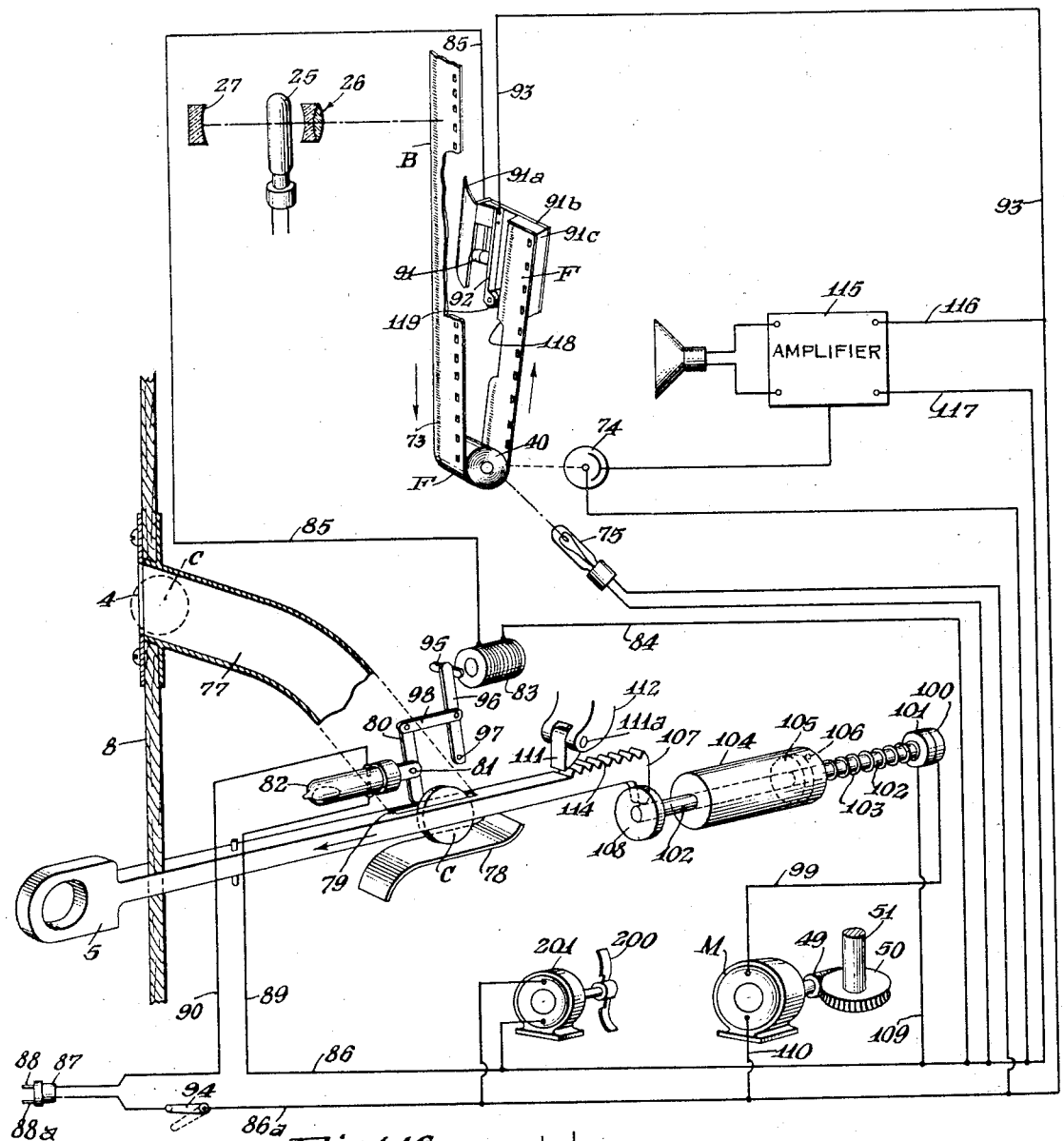
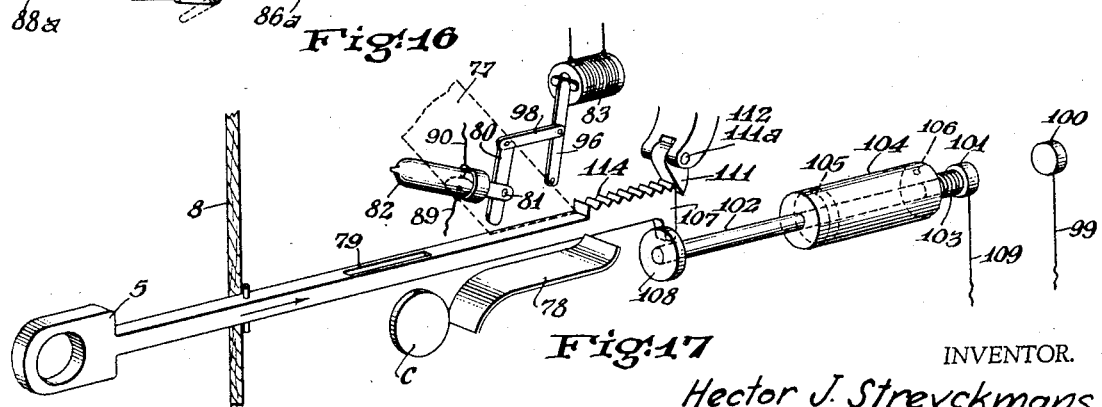

Patented July 2, 1940

2,206,134

UNITED STATES PATENT OFFICE 2,206,134

MULTIPLE MOTION PICTURE PROJECTOR

Hector J. Streyckmans, New York, N. Y., assignor, by mesne assignments, to Carl Sherman, escrow agent, New York, N. Y.

Application August 26, 1938, Serial No. 226,841

9 Claims. (Cl. 88—16.2)

My invention relates to a new and improved multiple motion picture projector.

One of the objects of my invention is to provide a device which can be used for entertainment purposes or for advertising purposes whereby a series of motion picture films are associated with a single lamp and projection system, and whereby any selected film can be operated in conjunction with said single lamp and projection system.

Another object of my invention is to provide a device of this type in which each film is provided with a single roll or spool which serves both as a magazine roll and a take-up roll.

Another object of the invention is to provide an apparatus of this type in which the combination magazine and take-up rolls of the respective films are mounted upon a common carrier, which is preferably in the form of a pivoted carrier having planar faces on which said combination spools are mounted.

Another object of the invention is to provide a device which can be manufactured at relatively low cost and which will be simple, durable and reliable in operation.

Other objects of the invention will be stated in the following description and drawings which illustrate a preferred embodiment thereof, it being understood that the above statement of the objects of my invention is intended generally to explain the same without limiting it in any manner.

Fig. 1 is a perspective view showing the casing of the device.

Fig. 3 is a diagrammatic view illustrating how the film is fed off a roll of film from the center thereof and how the same film is rewound upon the same roll at the periphery thereof.

Fig. 6 is a sectional view on the line 6—6 of Fig. 5.

Fig. 7 is a detail elevation in the direction of the arrow 7 which is shown in Fig. 5.

Fig. 8 is a sectional view on the line 8—8 of Fig. 7.

Fig. 9 is a sectional view on the line 9—9 of Fig. 5.

Figure 5:
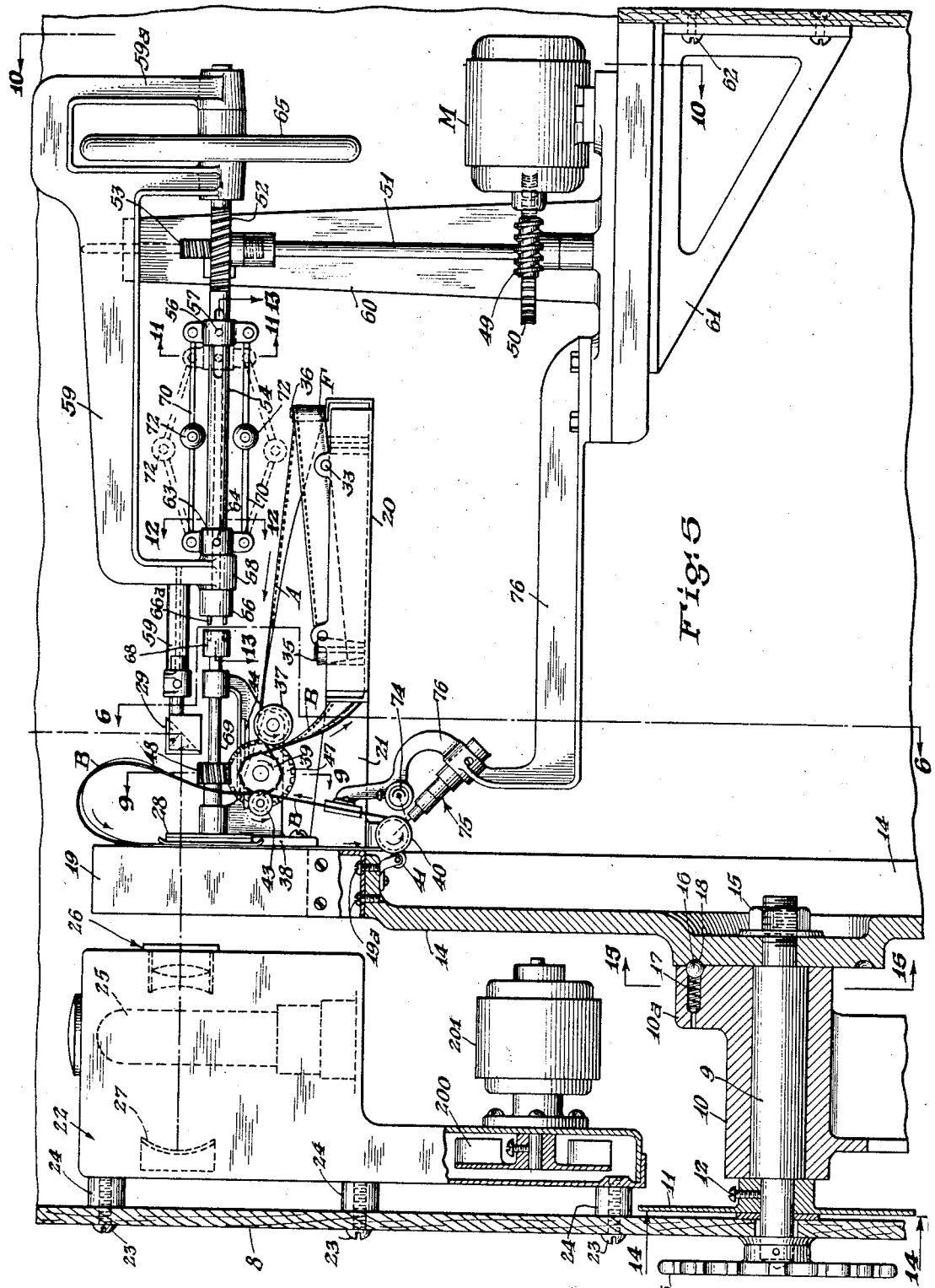
Fig. 5 is a partial section, also partially in elevation, generally similar to Fig. 4, and showing the carrier in greater detail.
Figures 11, 12:
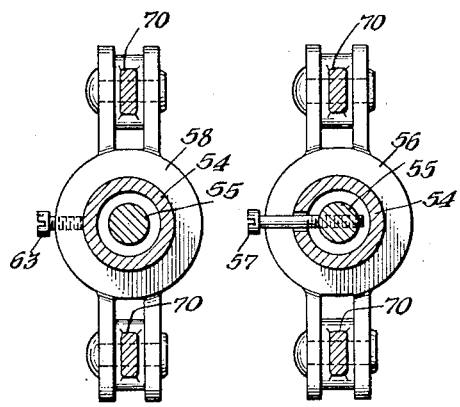
Figure 13:
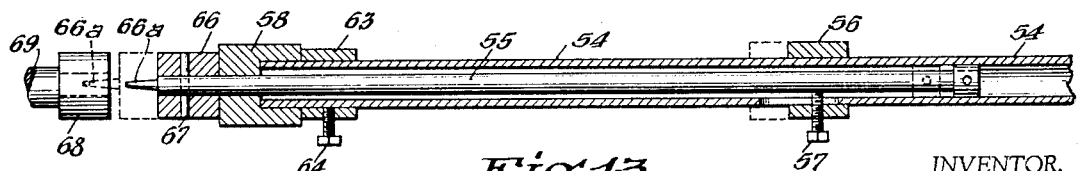

Figs. 11, 12 and 13 are respectively sectional views on the lines 11—11, 12—12 and 13—13 of Fig. 5.

Figure 14:
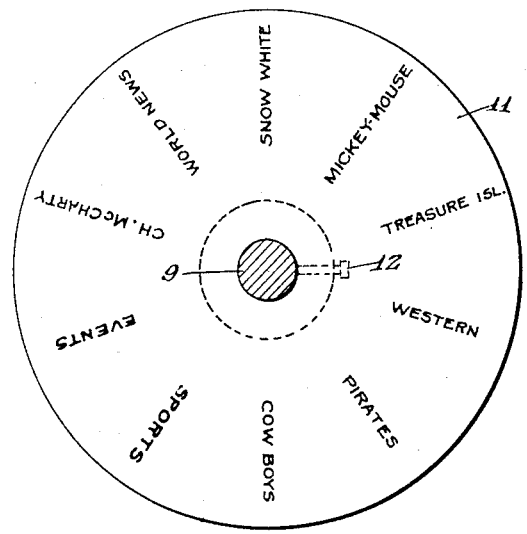

Fig. 14 is a section on the line 14—14 of Fig. 5.

Figure 15:
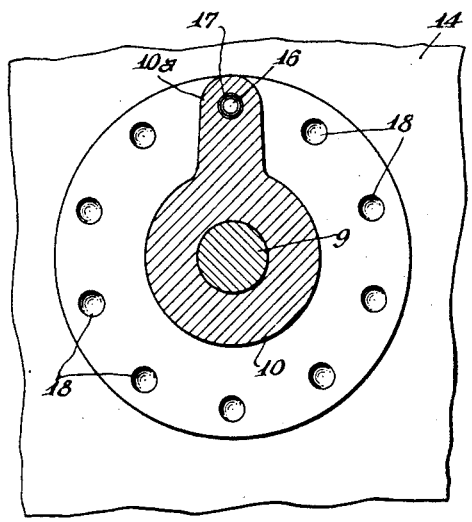

Fig. 15 is a section on the line 15—15 of Fig. 5.

Fig. 16 is a diagrammatic view of the electric circuit for controlling the movement of each film, including the sound reproducing apparatus. This shows the positions of the various circuit parts, prior to the operation of a respective film.

Fig. 17 is a diagrammatic view which illustrates the positions of some of the circuit-controlling parts of Fig. 16 at the end of the operative stroke of rod 5, which closes the circuit for operating the device.

The apparatus is provided with a casing 1, having a projection screen 2, a ventilating opening 3 having a suitable grille or screen, and a coin slot 4 and a rod 5 for operating the coin-actuated mechanism. Fig. 1 also shows a selector knob 6. The front wall of the casing is also provided with an aperture 7, through which the patron can view the names of the motion picture films which are available for selection.

Figure 4:
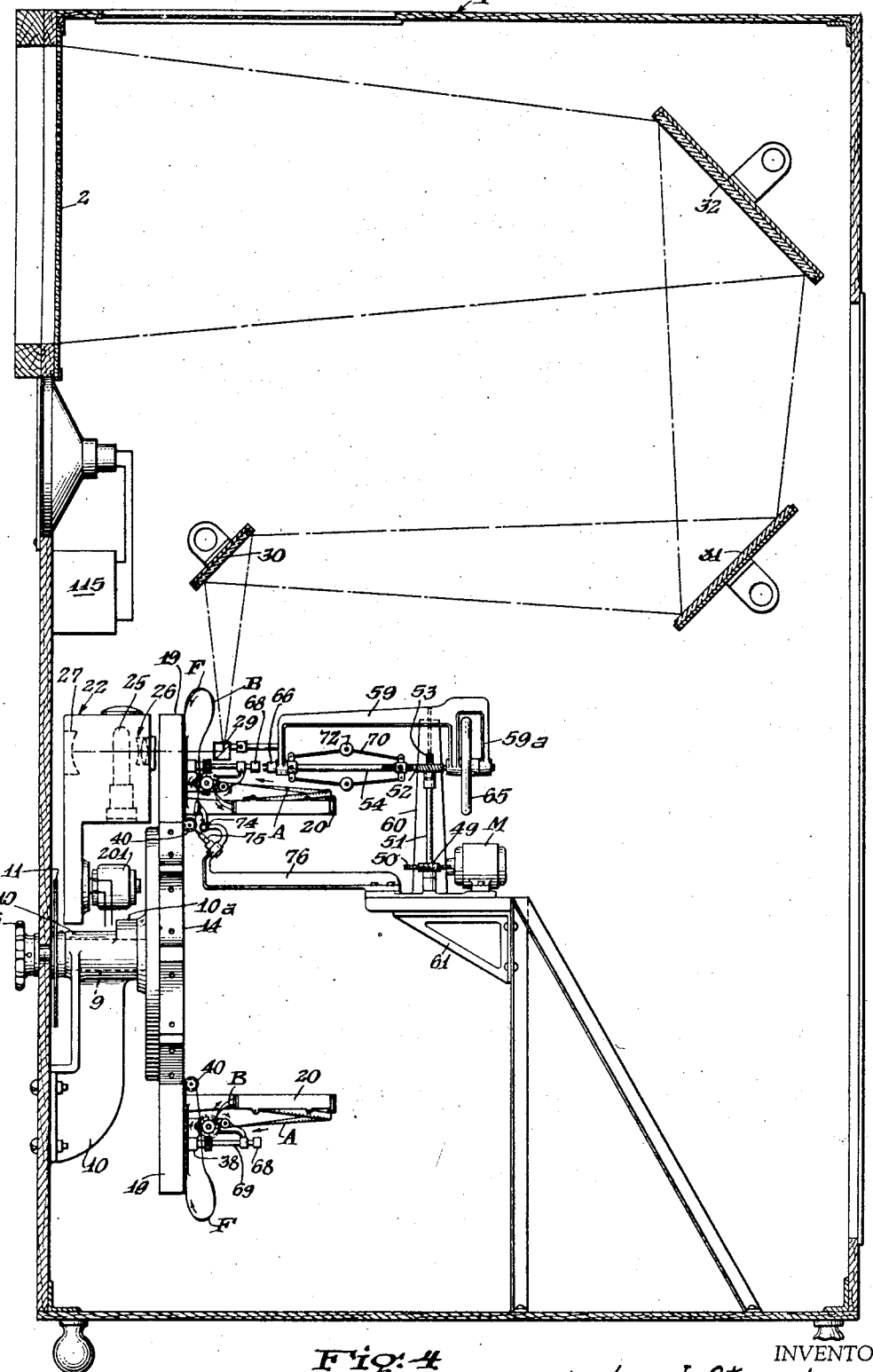
Fig. 4 is a vertical sectional view, partially in elevation, of the complete apparatus, including the casing.

As shown in Fig. 5, the casing 1 is provided with a front wall 8. A shaft 9 is supported in a bracket 10. As shown in Fig. 4, the bracket 10 is connected to the front wall 8 by screws, rivets or the like. A selector wheel 11 is connected to the reduced portion of the shaft 9, by means of a screw 12. This selector wheel 11 has the names of the films radially recorded thereon. In the present embodiment there are ten films in the casing 1, but the number could be varied. The locations of the titles of the films correspond to the respective locations of the corresponding films on the carrier, as will be later more fully described. The titles of the films which are shown in Fig. 14 can be seen through the aperture 7 which is provided in the front wall 8 of the casing.

Referring to Fig. 5, the carrier 14 is connected to the shaft 9, so that members 14 and 9 turn in unison. For this purpose a nut 15 clamps the carrier 14 against a corresponding shoulder of the shaft 9. One face of the carrier 14 substantially abuts the end face of the bearing of the bracket 10, there being enough clearance to permit easy turning of the wheel 14 and the shaft 9 relative to said bearing.

Means are provided for releasably holding the carrier 14 in any desired adjusted position. For this purpose I provide a detent ball 16 which is pressed outwardly by a spring 17. As shown in Fig. 15, the carrier 14 is provided with a series of depressions 18. The ball 16 releasably engages a selected depression 18 so as to hold the wheel 14 in adjusted position, although the wheel 14 can be moved out of said adjusted position to a new adjusted position by using enough force to overcome the force of the spring 17. As shown in Figs. 5 and 15, the bearing of bracket 10 is provided with a vertical projection 10a in which the detent ball 16 is housed.

As shown in Figs. 5 and 6, the carrier 14 is provided with a plurality of equally spaced planar faces at its periphery. As shown in Fig. 6, the upright radially projecting mounts 19 for the respective shutter mechanisms are connected to said planar faces. The shutter mounts 19 are connected to said planar faces by means of screws 19a, as shown in Fig. 5. Fig. 5 also shows the film mounts 20 which are parallel to the axis of shaft 9, and which are supported by means of brackets 21 directly from the mounts 19 for the shutter mechanisms.

Figure 2:
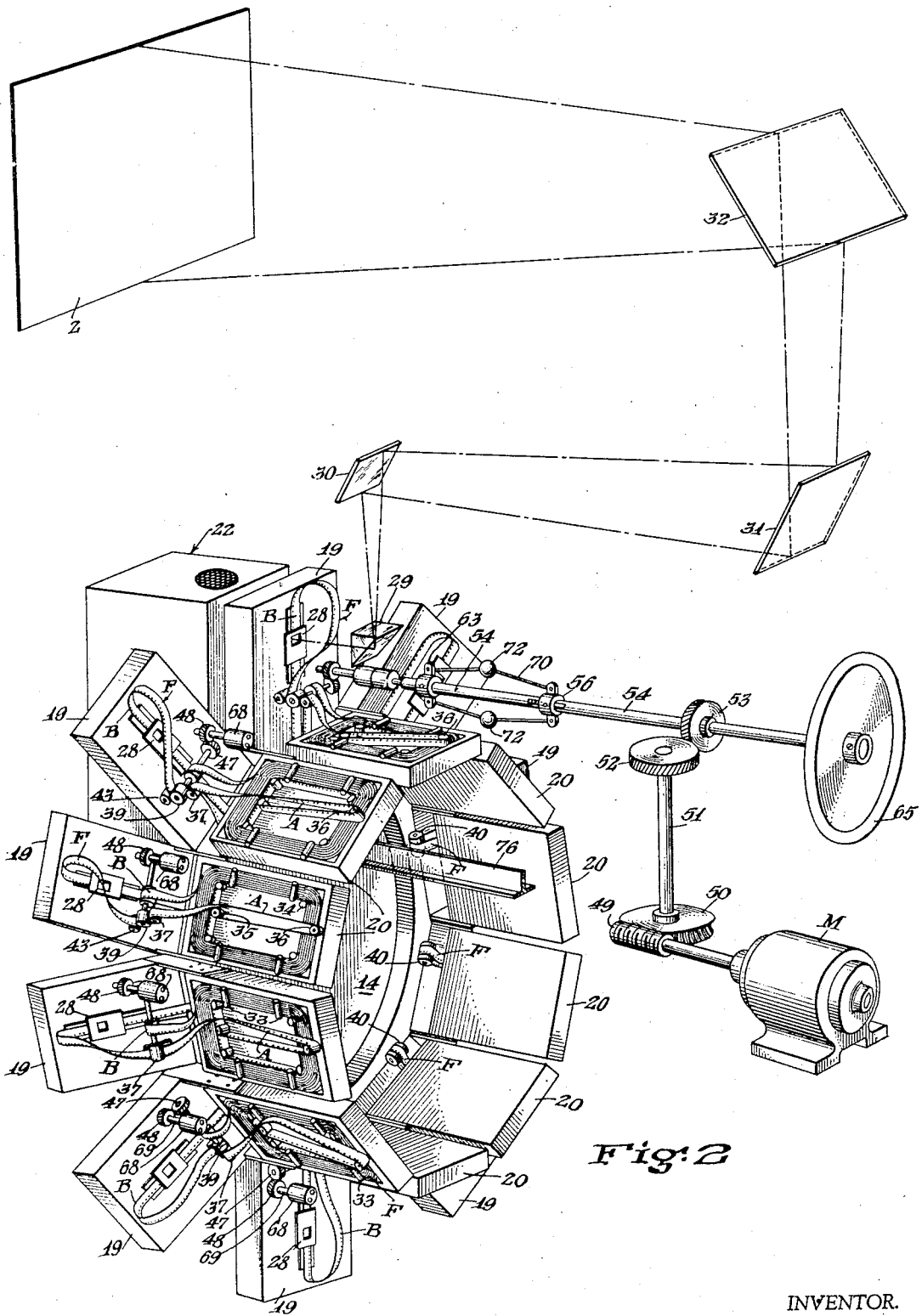
Fig. 2 is a diagrammatic perspective view illustrating the common carrier for the respective films and certain accessory parts.

As shown in Figs. 2 and 5, a conventional lamp housing 22 is connected to the front wall 8, by means of screws 23 and spacing blocks 24. The lamp and projection system are of the usual kind and it includes the lamp 25, the reflector 27, and the condenser lens system 26. Each shutter mount 19 is provided with a gate 28 through which the respective film is fed in the direction of the arrows shown in Fig. 5.

As shown in Fig. 2, the projected image of the frame is reflected upwardly by total reflection, by the prism 29. An objective lens can be located adjacent prism 29. It is not necessary to show this well-known lens in the drawings. Its action is indicated by the diverging lines in Figs 2 and 4. The light is then reflected by means of the mirrors 30, 31 and 32, upon the screen.

As shown in Fig. 3, the film-carriers 20 are of box-like shape. Anti-friction rolls 33 are swivelled to the bottom wall and to the lateral walls of the film-carrier 20, so as to provide easy movement of the film F. Four additional rolls 34 are swivelled so as to turn around axes which are perpendicular to the bottom of the film-carrier 20. The film F is wound in a series of abutting layers around these four rolls 34, so that the roll of film has a general rectangular shape with rounded corners. The shape of the roll of film can be varied and this is immaterial.

An additional frusto-conical roll 35 is turnably connected to the bottom of the film-carrier 20 (Fig. 3). This frusto-conical roll 35 has the same shape as the companion roll 36, the top end of the roll 35 being of greater diameter than the bottom end thereof. The inner end of the film is fed off the roll of film, along the roll 35, in the direction of the arrow shown in Fig. 3, and the film is then led around the roll 36. The roll 36 is swivelled to the wall 20b of the film-carrier 20. For this purpose a lateral lug is provided at the wall 20b as shown in Fig. 3. The film is now led outwardly in said run A. The film in said run A is twisted as shown in Fig. 3, and said run A passes around the idler guide-roll 37, which is mounted in a bracket 38, which is secured to the mount 19 for the shutter mechanism. As shown clearly in Fig. 5, the film is provided with the usual sprocket feed holes. The run A now passes around the sprocket 39 which is provided with the usual teeth which register with the holes in the film. The drawings show the film as being provided with only a single row of holes but two rows of holes could be provided. The film is now led upwardly so as to form a run B, which is shown in Fig. 5. The run B is fed through the gate 28, and the film then passes around an idler guide roll 40 which is mounted turnably in the bracket 21. An idler pressure roll 41 is mounted in a bearing which is suitably connected to the periphery of the carrier 14, so as to press the film against the idler guide roll 40. The succeeding run of the film is also designated by the reference letter B in Fig. 5 and this run B is passed through the sound-reproducing mechanism and around an equal sprocket 42 (Fig. 9), which is mounted upon the same shaft as the sprocket 39. The sprockets 39 and 42 are keyed to their common shaft 46, so that they turn in unison to feed the film at the same speed.

As shown in Fig. 5, an additional idler guide roll 43, having a smooth periphery, is turnably mounted in a slide frame 44, which is slidably mounted on an extension of the bracket 38, as shown in Fig. 9. A set screw 45 whose shank passes through a slot of frame 44 holds the frame 44 releasably in adjusted position. After the run B has passed around the sprocket 42, and as shown in Fig. 3, the run is led around the outside of the roll of film F. For this purpose the wall 20c of the member 20 is provided with a guide slot and a guide roll 20d is provided at said slot. Therefore, as the film is withdrawn from the interior of the respective film roll, it is continuously replaced at the outer periphery thereof. Each film is endless.

As shown in Fig. 9, the shaft 46 of the sprockets 39 and 42 is mounted in a bearing which is connected to the bracket 38. Said shaft is provided with a skew gear 47, which meshes with a driving skew gear 48.

The shutter mechanism which is supported upon each mount 19 is not shown, as it is conventional. Special means are provided for actuating the selected film in its selected position and for simultaneously actuating the respective shutter mechanism. As shown in Fig. 16, an electric motor M has its armature shaft provided with a worm 49, which meshes with a worm wheel 50 on the shaft 51.

Figure 10:
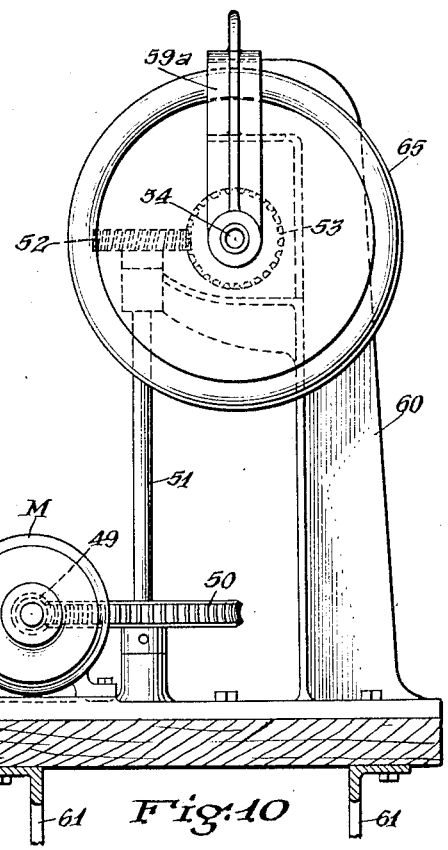
Fig. 10 is a sectional view on the line 10—10 of Fig. 5.

While I do not wish to be limited to the practical working example, the preferred speed of the motor M is 1800 revolutions per minute and the reduction ratio of the worm 49 and the worm wheel 50 is as 1 to 5, so that the shaft 51 turns at the rate of 360 revolutions per minute. As shown in Figs. 2 and 10, the shaft 51 is provided at its top with a skew gear 52, which meshes with an equal skew gear 53, on the hollow shaft 54. Hence, the hollow shaft 54 is turned at the rate of 360 revolutions per minute.

As shown in Fig. 13, an inner solid shaft 55 is located slidably in the outer hollow shaft 54. As also shown in Fig. 13, a collar 56 is clamped to the inner shaft 55 by means of a set-screw 57. The outer hollow shaft 54 is provided with a longitudinal slot, through which the shank of set-screw 57 extends, so as to permit limited sliding movement of the inner solid shaft 55 relative to the outer hollow shaft 54.

One end of the hollow shaft 54 is supported turnably in a bearing 58 which is part of the bracket 59 which is shown in Fig. 5. The bracket 59 is integral with the standard 60 whose base is mounted upon the bracket 61, which is connected to the rear wall of the casing by means of screws 62. The hollow shaft 54 is provided with a collar 63 which is fixed thereto by means of a set screw 64, so as to prevent lateral sliding movement of the shaft 54 relative to the bearing 58, in one direction.

A fly wheel 65 is keyed to the hollow shaft 54, and suitable means are provided in the angular portion 59a of the bracket 59, to prevent the hollow shaft 54 from sliding in either direction relative to its bearings.

A pin clutch-collar 66 is connected to the inner shaft 55 by means of a transverse pin 67. The clutch-collar 66 is provided with a plurality of pins 66a. Said pins 66a are parallel to the axis of shaft 55. A recessed clutch-collar 68 is mounted on a counter-shaft 69 whose axis is aligned with the common axis of the shafts 54 and 55. The counter-shaft 69 has the skew gear 48 thereon, and this meshes with skew gear 47 of shaft 46. The ratio of gears 48 and 47 is as 1 to 2, so that the shaft 46 turns 180 revolutions per minute. The shaft 69 also drives the shutter mechanism (not shown).

As shown in Fig. 5, governor arms 70 are pivoted to common weights 72 and the outer ends of said governor arms are respectively pivoted to the collars 56 and 63. When the hollow shaft 54 reaches a predetermined speed, the weights 72 fly outwardly, and they turn the arms 70 to move the slidable collar 56 to the left (referring to Figs. 5 and 13), since the collar 63 is rigidly secured to the hollow shaft 54. This moves the pin clutch-collar 66 so that its pins will engage the recesses in the corresponding clutch-collar 68, thus feeding the selected film and operating the respective shutter. Fig. 13 shows in broken lines how the pins 66a engage the recesses of the collar 68.

The mechanism has conventional means for reproducing the sound record of the film.

Fig. 9 shows a conventional sound-track 73 on the film F. Fig. 5 shows a photo-electric cell 74, which scans the sound-track of the selected film. The photo-electric cell cooperates in combination with the conventional lamp house and projection system 75 which projects a beam of light upon the sound-track 73, so that the reflected light falls upon the photo-electric cell 74. The elements 74 and 75 are mounted upon a bracket 76. As shown in Fig. 5, said bracket 76 is supported independently of the carrier 14, so that the carrier 14 can turn relative to said bracket 26 and the members 74 and 75. I prefer to use light which is reflected from a portion of the sound-track of the selected film, and to have said selected portion of the sound-track abutting the curved periphery of the member 40.

This combination makes it possible to use a single photo-electric cell and a single lamp-house 75, even though the carrier has ten or more films mounted thereon.

While the application is not limited to use in combination with coin-controlled mechanism, the embodiment includes such mechanism.

The person who desires to use the apparatus will first turn the knob 6 until the title of the selected film which appears on the wheel, will be aligned with the peep slot 7. The coin is then inserted into the slot 5 and the coin falls down the chute 77 into the full-line position indicated by the reference letter C in Fig. 16. The coin then rests upon a support 78 which is made of thin and resilient metal, and which is connected in any suitable manner (not shown) to the cabinet 1. In this position the coin is located in a slot 79 of the rod 5. The rod 5 is then pulled outwardly in the direction of the arrow shown in Fig. 16. When the rod 5 is pulled outwardly, the coin C contacts with the lever 80, which is pivoted to the casing at 81, so that the lever 80 is turned in the clockwise direction, as shown in Fig. 17.

A mercury switch 82 is rigidly connected to the lever 80, so that the mercury switch is tilted into the position shown in Fig. 17. When the mercury switch is thus tilted, it closes the circuit of the coil of the electro-magnet 83. As shown in Fig. 16, the ends of the coil of the electro-magnet 83 are connected to the wires 84 and 85. The wire 84 is connected to one of the main wires 86, which is connected to the terminal 88 of the plug 87 through the wire 89, the mercury switch 82, and the wire 90. Hence, when the switch 82 is in the position shown in Fig. 17, the terminal 88 is connected to one side of the coil of the electro-magnet 83.

As shown in Figs. 7 and 16, the wire 85 is connected to the contact 91 of a switch which has a switch blade 92. This blade 92 normally touches the contact 91, so that the wire 85 is normally connected to the wire 93 which is shown in Fig. 16. This wire 93 is connected to the second main wire 86a, which is connected to the terminal 88a of the plug 87. A manually operable line switch 94 is also provided.

As shown in Fig. 8, an arm 91b is connected to bracket 76. When the reel or carrier 14 is turned to move a selected film to the operating position, the loose loop part of the selected film which is between members 40 and 43, is guided across the curved extension 91a of arm 91b, as shown in broken lines in Fig. 8, to the full-line position in Fig. 8. A pad 91c of felt or other soft material is connected to arm 91b. The selected film will abut said pad 91c and its edge will abut idler roll 119, (see Fig. 7) whose bearing is connected to tiltable switch-blade 92.

When the electro-magnet 83 is energized, it attracts the armature 95, thus turning the lever 96 which is pivoted to the casing at 97, and which is connected to the lever 80 by means of a link 98. Therefore, and as shown in Fig. 17, the electro-magnet 83 maintains the mercury switch 82 in circuit-closing position, as long as the electro-magnet 83 remains energized.

The motor M has a wire 99, which is connected to a stationary contact 100, which is suitably connected to the wall of the casing. The contact 100 is normally in contact with a movable contact 101, which is mounted at the end of a rod 102, around which a compression spring 103 is located. The rod 102 extends through a cylinder 104 and a piston 105 is mounted on the rod 102. The cylinder 104 is provided with an opening 106 which has a suitable dash-pot valve so that the contact 101 can be moved rapidly away from the contact 100, against the force of the spring 103. The rod 5 has a lug 107, which abuts a collar 108, which is fixed rigidly to the rod 102. Therefore, when the rod 5 is pulled outwardly, the contact 101 is moved away from the contact 102, thus compressing the spring 103, as shown in Fig 17.

When the rod 5 is released, the spring 103 slowly moves the contact 101 against the contact 100, due to the action of the dash-pot valve of cylinder 104, and said spring therefore moves the rod 5 back to the normal position shown in Fig. 16. If desired, the rod 5 could have an auxiliary compression spring, in order to return it to the normal position shown in Fig. 16, after said rod has been pulled to the operative position shown in Fig. 17. The contact 101 is connected by means of the wire 109 to the wire 86 and the motor M is provided with an auxiliary wire 110 which is connected to the wire 86a. The circuit of the motor cannot be closed until the mercury switch 82 is in the operative position shown in Fig. 17. In order to make it necessary to pull the rod 5 outwardly and fully to the position shown in Fig. 17, so that the coin will drop off the member 78 into a suitable receptacle, a pawl 111 is pivoted at 111a to an arm 112 which is suitably connected to the cabinet 1. The rod 5 has a series of ratchet teeth 114. The pawl 111 turns freely relative to its support 112. The length of the pawl 111 exceeds the vertical distance between its pivot 111a and the ratchet teeth 114. Therefore, if the rod 5 is pulled outwardly only partially, the pawl 111 remains inclined to the longitudinal axis of the rod 5, thus preventing the rod 5 from moving inwardly. However, if the rod 5 is moved outwardly to the operative position shown in Fig. 17, the pawl 111 drops behind the inner end of the rod 5, so that it does not oppose the inward movement of said rod.

An amplifier 115 is connected by wire 116 to the wire 93, which is connected directly to the wire 86a. The other terminal of the amplifier is connected by a wire 117 to the wire 86. When the rod 5 is in the position shown in Fig. 17, and said rod is then released, the current is supplied immediately to the amplifier tubes, thus heating them. The circuit of the motor M is not closed until the contact 101 touches the contact 100 and the dash-pot or other suitable time-delay mechanism therefore prevents the motor M from operating until the tubes of amplifier 115 have been sufficiently heated to make it operative to reproduce and to amplify sound.

Referring to Fig. 16, each film F is provided with a switch-controlling cut-out 118. When the picture on the endless film has been reproduced completely, the cut-out 118 registers with the roller 119 of the switch arm 92, so that the switch arm is free to fall away from the contact 91, as shown in broken lines in Fig. 7, thus opening the circuit of the electromagnet 83. The mercury switch 82 then drops back to the inoperative position shown in Fig. 16, thus stopping the operation of the device. However, the momentum of the apparatus continues to operate the same and to feed the film F until the cut-out 118 clears the switch arm 92, and the straight edge of the film F then moves the switch arm 92 back to the normally closed position.

However, by this time the mercury switch has fallen back to the position shown in Fig. 16.

Hence, after a film has been completely displayed, the apparatus stops and it is ready to be started anew by the selection of an additional film and the insertion of an additional coin.

A fan 200 is operated by a fan motor 201, which is connected to the wires 86 and 86a, as shown in Fig. 16. Therefore, while the apparatus is operating, the fan 200 circulates air through the housing of the projection system, in which the lamp 25 is located, thus preventing overheating.

The operation of the device is as follows:

The patron turns the knob 6 until the title of the selected film can be seen through the peep hole 7. This turns the carrier 14 until the selected film and its associated shutter mechanism are aligned with the projection system and the sound-scanning system. The coin is deposited and rod 5 is pulled outwardly, and line switch 94 is closed. The contact 101 is thus separated from the contact 100, thus breaking the circuit of motor M between said contacts. Mercury switch 82 is turned to the operative position, thus closing the circuit of electro-magnet 83, since switch blade 92 normally contacts the terminal 91. The movement of mercury switch 82 to its operative position also closes the circuit of the tubes (not shown) of amplifier 115. Contact 101 is moved back slowly to its operative position shown in Fig. 16. When said contact is in said operative position, the tubes of amplifier 115 have been sufficiently heated to make them operative. Motor M now feeds the film until cut-out 118 permits switch-blade 92 to move out of its operative position under the force of gravity or a spring (not shown).

This breaks the circuit of electro-magnet 93, so that the mercury switch is turned by the force of gravity to the inoperative position shown in Fig. 17. The circuit of motor M is simultaneously broken, since this circuit includes mercury switch 82. The momentum of the apparatus moves the selected film until cut-out 118 clears the switch-blade 92, but this will not close the circuit of motor M because the force of gravity retains mercury switch 82 in the inoperative position of Fig. 16.

As shown in Fig. 2, the film has a loose loop intermediate the driving sprockets 39 and 42. Hence the shutter mechanism can have the usual means (if desired) for actuating the film intermittently through the gate, so as to project the frames of the film successively, while the exposed frame is stationary.

In the broadest aspect of the invention it includes the movable multiple carrier 14 which may be moved through any path, projection means which may or may not include sound reproducing means, and actuating means mounted on said carrier for projecting each film, and common actuating mechanism which can be connected to or disconnected from said actuating means.

While I have shown a complete operative machine, the invention includes numerous sub-combinations which may be used in other types of machines, and said sub-combinations need not be operative per se.

As shown in Fig. 4, each film-mount is inclined to its shutter-mechanism, so that there is an angular space between the film-mounts and the shutter-mechanisms. An element of the projection means, namely, the prism 29 which is shown in greater detail in Fig. 2, is located in said angular space. The angle of said angular space is 90°, in the embodiment which has been illustrated. This angle can be greatly varied.

If the mechanism is not to be coin-controlled, the coin C in the full-line position shown in Fig. 16 can be replaced by the familiar one-way pawl which will operate lever 80 when rod 5 is pulled outwardly and which will slip under lever 80 when rod 5 is moved inwardly.

The invention is not limited to a turnably-mounted main carrier 14 unless expressly stated in a claim or claims. In some of the claims I have stated that the projection means, namely, reflector 27, lamp 25, lenses 26, reflectors 29, 30, 31 and 32 are supported independently of the main carrier 14. A series of prisms or reflectors 29 could be mounted on the main carrier with little expense. Hence, whenever I state in a claim or claims that the projection means are supported independently of the main carrier, I include a multiple projector in which members 29 or other minor and cheap parts of the projection means are mounted on the carrier. The sprockets 39 and 42 and their associated parts are defined in the claims as actuating means for actuating the films during the projection thereof.

In Fig. 16 I have shown the film shaped to permit switch arm 92 to move to the circuit-opening position to which position said arm 92 is biased by gravity. The invention is not limited to shaping the film for this purpose or to a switch-arm 92 which is biased to the circuit-opening position. Photo-electric means for operating a switch-arm or other member are well-known and standard equipment. Such photo-electric means could be used in combination with recess 118 so that the beam of light of said photo-electric means would be of greater intensity when said beam passed through said recess, instead of passing through the unrecessed part of the film. Hence photo-electric means could be used for moving switch-arm 92 to the circuit-opening position.

Hence it is not necessary that arm 92 should be biased to the circuit-opening position, because if the circuit of the electro-magnet or relay 83 is held open a short time, switch 82 can move to the circuit-opening position.

I claim:

1. In a multiple projector, the sub-combination of a turnably mounted main carrier having a plurality of film-mounts and shutter-mechanisms mounted thereon, each film-mount being inclined to its respective shutter mechanism to provide a continuous angular space, projection means adapted to project a selected film and supported independently of said carrier, said carrier also having actuating means adapted to actuate a selected film relative to said projection means so as to project said selected film, drive mechanism mounted on a support other than said carrier and adapted to be connected to said actuating means so as to operate the same, said drive mechanism having a support which is located in said angular space.

2. In a multiple projector, the sub-combination of a movable main carrier having a plurality of film-carriers mounted thereon, films carried by said film-carriers, projection means adapted to project a selected film. actuating means mounted on said main carrier and adapted to actuate a selected film during the projection thereof, an electric motor adapted to drive said actuating means, the circuit of said motor including a switch having an arm which is biased to open said switch and to open the circuit of said motor, the selected film abutting said arm when the carrier is adjusted to select said film so that the film normally holds said arm in the circuit-closing position, each film being shaped at a predetermined portion thereof to permit the movement of the arm to the circuit-opening position, said actuating means having sufficient momentum to actuate the film until said predetermined portion clears said arm when the circuit of the motor is opened, additional switch means adapted to control the circuit of the motor, said additional switch means being operable independently of the first-mentioned switch arm.

3. A multiple projector according to claim 2, in which each film is endless and in which each film has a portion which is spaced from said main carrier, said arm being located to contact with said portion of the selected endless films, means adapted to guide said portions of the films successively into contact with said arm when the carrier is adjusted to select a film.

4. In a multiple projector, the sub-combination of a movable main carrier which has a plurality of films mounted thereon, said films being movable relative to said main carrier, projection means adapted to project a selected film, said main carrier having actuating means adapted to actuate said films during the projection thereof, said films having sound tracks thereon, sound reproducing means which include an electric amplifier, an electric motor adapted to drive said actuating means, the circuit of the amplifier including a first switch which is biased to circuit-opening position, the circuit of the motor including said first switch and also including a second switch which is biased to circuit-closing position, manually-operable means adapted to close the first switch and to open the second switch when said manually-operable means are actuated, retarding means adapted to retard the movement of the second switch to the circuit-closing position during a predetermined period, additional means adapted to hold the first switch in the circuit-closing position during a predetermined period and then to release the first switch.

5. In a multiple projector, the sub-combination of a movable main carrier, said carrier having a plurality of films mounted thereon and movable relative thereto, projection means adapted to project a selected film, said carrier having actuating means adapted to actuate the respective films across the projection means, an electric motor, means adapted to couple said motor to the actuating means of a selected film to drive said actuating means, the circuit of said motor having a switch which is biased to the circuit-opening position, manually-operable means adapted to actuate said switch to the circuit-closing position, additional means adapted to hold said switch in the circuit-closing position, said additional means being controlled by a porton of the selected film to release said switch and to permit said switch to move to the circuit-opening position after a predetermined portion of the film has been projected.

6. In a multiple projector, the sub-combination of a turnably mounted main carrier having a plurality of film-mounts thereon, projection means supported independently of said main carrier and adapted to project a selected film, said main carrier having actuating means adapted to actuate each film and to guide the film in a predetermined path relative to the main carrier and the projection means, a drive-shaft supported independently of said main carrier, coupling means adapted to couple the drive-shaft to said actuating means and to uncouple the drive-shaft from said actuating means, an electric motor adapted to drive said drive-shaft, the carrier and the parts therein being located to clear said drive-shaft when it is uncoupled from the actuating means, the circuit of said motor including a first switch and an electro-magnetic relay which is adapted to hold said first switch in circuit-closing position as long as said relay remains energized, said first switch being in the circuit of said relay, the circuit of said relay including a second and normally closed switch, said film-mounts having films which respectively have parts thereof adapted to control the second switch in order to permit the same to open at the completion of the projection of the selected film, manually-operable means adapted to move the first switch to the circuit-closing position, said actuating means having sufficient momentum to cause the selected film to continue its movement after the completion of its projection so as to close the second switch.

7. A multiple projector having a turnable main carrier mounted to turn about a predetermined axis, said carrier having a plurality of film-carriers mounted thereon, said carrier also having a plurality of shutter-mounts mounted thereon, each film-carrier being associated with one of said shutter-mounts, endless films held in said film-carriers, projection means mounted independently of said main carrier and adapted to project a selected film, said main carrier having respective actuating means adapted to actuate each film and to guide it in a predetermined path relative to the associated shutter-mount and the projection means in order to project a selected film, each said actuating means having a coupling member which is spaced from the periphery of said carrier, a drive-shaft spaced from said periphery, coupling means adapted to couple the drive-shaft to a selected actuating means and to uncouple the drive-shaft from the selected actuating means, the carrier and the parts thereon being located to clear the drive-shaft when the carrier is turned relative to the drive-shaft.

8. A multiple projector having a turnable main carrier mounted to turn about a predetermined axis, said carrier having a plurality of film-carriers mounted thereon, said carrier also having a plurality of shutter-mounts mounted thereon, each film-carrier being associated with one of said shutter-mounts, endless films held in said film-carriers, projection means mounted independently of said main carrier and adapted to project a selected film, said main carrier having respective actuating means adapted to actuate each film and to guide it in a predetermined path relative to the associated shutter-mount and the projection means in order to project a selected film, each said actuating means having a coupling member which is spaced from the periphery of said carrier, a drive-shaft spaced from said periphery, coupling means adapted to couple the drive-shaft to a selected actuating means and to uncouple the drive-shaft from the selected actuating means, the carrier and the parts thereon being located to clear the drive-shaft when the carrier is turned relative to the drive-shaft, each shutter-mount being inclined to its respective film-mount, said coupling members being located in the angular space between the shutter-mounts and the film-mounts.

9. A multiple projector having a turnable main carrier mounted to turn about a predetermined axis, said carrier having a plurality of film-carriers mounted thereon, said carrier also having a plurality of shutter-mounts mounted thereon, each film-carrier being associated with one of said shutter-mounts, endless films held in said film-carriers, projection means mounted independently of said main carrier and adapted to project a selected film, said main carrier having respective actuating means adapted to actuate each film and to guide it in a predetermined path relative to the associated shutter-mount and the projection means in order to project a selected film, each said actuating means having a coupling member which is spaced from the periphery of said carrier, a drive-shaft spaced from said periphery, coupling means adapted to couple the drive-shaft to a selected actuating means and to uncouple the drive-shaft from the selected actuating means, the carrier and the parts thereon being located to clear the drive-shaft when the carrier is turned relative to the drive-shaft, each shutter-mount being inclined to its respective film-mount, said coupling members being located in the angular space between the shutter-mounts and the film-mounts, the axis of said drive-shaft being substantially parallel to said predetermined axis, said coupling means being movable back and forth in a direction parallel to said predetermined axis.

HECTOR J. STREYCKMANS.